(12) United States Patent
Li et al.

(10) Patent No.: US 7,058,371 B2
(45) Date of Patent: Jun. 6, 2006

(54) MECHANISM FOR MODULATING WIRELESS COMMUNICATION SIGNALS

(75) Inventors: Shaolin Li, Fremont, CA (US); Did-Min Shih, Milpitas, CA (US)

(73) Assignee: Via Technologies, Inc., Taipei (TW)

( * ) Notice: Subject to any disclaimer, the term of this patent is extended or adjusted under 35 U.S.C. 154(b) by 552 days.

(21) Appl. No.: 10/387,820

(22) Filed: Mar. 12, 2003

(65) Prior Publication Data

US 2004/0180636 A1    Sep. 16, 2004

(51) Int. Cl.
*H04B 1/04* (2006.01)
(52) U.S. Cl. ............ 455/116; 341/120; 341/147; 455/239.1
(58) Field of Classification Search ............ 455/43, 455/127.2, 125, 136, 138, 139, 177.1, 182.1, 455/182.2, 200.1, 205, 227, 232.1, 239.1, 455/313, 116; 375/297; 341/147, 120
See application file for complete search history.

(56) References Cited

U.S. PATENT DOCUMENTS 5,087,914 A * 2/1992 Sooch et al. ............ 341/120
5,321,401 A * 6/1994 White ................. 341/147
6,054,896 A   4/2000 Wright et al.
6,385,233 B1  5/2002 Berger

* cited by examiner

*Primary Examiner*—Duc Nguyen
*Assistant Examiner*—Justin Lee
(74) *Attorney, Agent, or Firm*—Hickman Palermo Troung & Becker, LLP; Bobby K. Troung (57) ABSTRACT

A modulating mechanism is provided comprising a first storage and a corresponding first DAC, and a second storage and a corresponding second DAC. The first storage stores an adjusted digital representation of a first waveform, while the second storage stores an adjusted digital representation of a second waveform. The adjusted representation of the first waveform is adjusted to compensate for the deviation effects experienced by the first DAC (e.g. amplitude deviation, DC offset, non-linearity, etc.). The adjusted representation of the second waveform is adjusted to compensate for the deviation effects experienced by the second DAC. In effect, the adjusted representations of the first and second waveforms cause the DAC's to exhibit the proper behavior, despite the presence of the deviation effects. By storing and using adjusted digital representations of waveforms in this manner, many benefits can be realized, including for example, eliminating the need for any analog compensation circuits.

36 Claims, 5 Drawing Sheets

MECHANISM FOR MODULATING WIRELESS COMMUNICATION SIGNALS

FIELD OF THE INVENTION

This invention relates generally to communications, and more particularly to a mechanism for modulating wireless communication signals.

BACKGROUND

The Global System for Mobile Communication (GSM) standard is used in many parts of the world (e.g. Europe and Asia) to enable digital wireless communication to be conducted between mobile units, such as mobile telephones. With GSM, it is possible for a plurality of mobile units to concurrently share the same frequency to conduct communications. Thus, with GSM, it is possible to accommodate more mobile units per frequency than with traditional analog systems.

As noted above, GSM enables digital information to be sent wirelessly. To send digital information using GSM, the digital information is first modulated onto a carrier signal. With GSM, digital information is typically modulated using Gaussian Minimum Shift Keying (GMSK), a well-known technique. GMSK signals have two components, an in-phase component and a quadrature-phase component. Both components are needed to properly modulate and demodulate a set of digital information. Each of the components is typically represented by a predetermined waveform. Further, each waveform corresponds to a particular set of digital information. Thus, for example, for the set of digital information "0110", there is a corresponding in-phase waveform and a corresponding quadrature-phase waveform. The in-phase waveform represents an in-phase signal component having the digital information "0110" already modulated thereon, and the quadrature-phase waveform represents a quadrature-phase signal component having the digital information "0110" already modulated thereon. These waveforms are predetermined and pre-stored. Thus, when it comes time to modulate a set of digital information (e.g. 0110), all that needs to be done is to access the waveforms corresponding to that set of digital information.

Typically, each waveform corresponds to a particular set of four digital bits. With four bits, there are sixteen possible combinations of 1's and 0's. Thus, there are sixteen possible in-phase waveforms and sixteen possible quadrature-phase waveforms. Due to symmetry, however, it is possible to reduce the number of waveforms from sixteen to four, so that in practice, only four in-phase waveforms and four quadrature-phase waveforms are pre-stored.

Each waveform is typically stored in digital form. This means that each waveform is represented as an X number of points, where each point represents a sample of the waveform. In some implementations, X is set to eight, so that each waveform is represented as eight sample points. Each sample point takes the form of a set of Y bits. In some implementations, Y is set to ten; thus, each point is expressed as a ten bit value.

Figure 1:
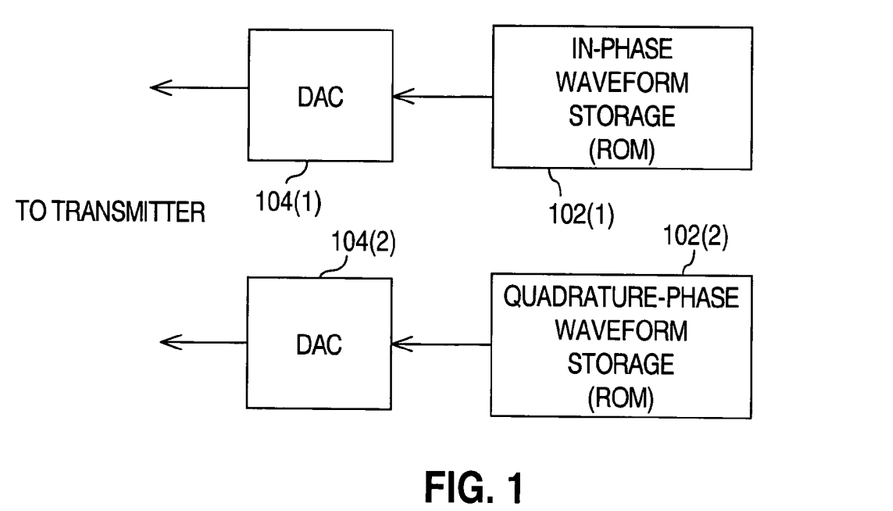
FIG. 1 is a block diagram of a simple signal modulation apparatus.

Because the waveforms are stored in digital form, they are converted to analog signals before being passed on to a transmitter. With reference to FIG. 1, there is shown an apparatus that can be used to carry out this conversion. The apparatus of FIG. 1 comprises two storages 102(1), 102(2), each typically taking the form of a read-only-memory (ROM), and two digital-to-analog converters (DAC's) 104(1), 104(2). Storage 102(1) stores the digital representations of the in-phase waveforms, and storage 102(2) stores the digital representations of the quadrature-phase waveforms.

In operation, a set of digital information (e.g. 0110) is determined to be modulated. Accordingly, the in-phase waveform corresponding to that set of digital information is read out of storage 102(1), and the quadrature-phase waveform corresponding to that set of digital information is read out of storage 102(2). DAC 104(1) converts each point of the in-phase waveform into a corresponding analog signal. Similarly, DAC 104(2) converts each point of the quadrature-phase waveform into a corresponding analog signal. Once generated, these analog signals are passed on to a transmitter for transmission. In this manner, the set of digital information is modulated and transmitted.

The apparatus shown in FIG. 1 functions satisfactorily if: (1) the DAC's 104(1), 104(2) exhibit ideal behavior; and (2) the DAC's 104(1), 104(2) are completely symmetrical. In actual implementation, however, this is rarely, if ever, the case. In practice, the DAC's 104 usually suffer from several deviation effects. A first deviation effect is referred to herein as amplitude deviation. Amplitude deviation is manifested when, given a certain digital input, a DAC 104 outputs an analog signal having an amplitude that is different than the amplitude that the DAC 104 is supposed to output. For example, the DAC 104 may output an analog signal with an amplitude of 0.9 volts when it is supposed to output an analog signal with an amplitude of 1 volt. The effects of amplitude deviation are exacerbated if the DAC's 104 are not symmetrical, because in that case, not only is there amplitude deviation, there is also an amplitude imbalance between the two DAC's 104, such that given the same digital inputs, the two DAC's 104 output analog signals of different amplitudes. This can lead to serious errors.

Another deviation effect experienced by the DAC's 104 is a direct current (DC) offset. This DC offset causes the output analog signals of a DAC 104 to be shifted by a certain DC amount. Again, this can lead to errors. Amplitude deviation and DC offset are just some of the imperfect behaviors that can be exhibited by the DAC's 104. Others, such as non-linearity, may also be exhibited.

Figure 2:
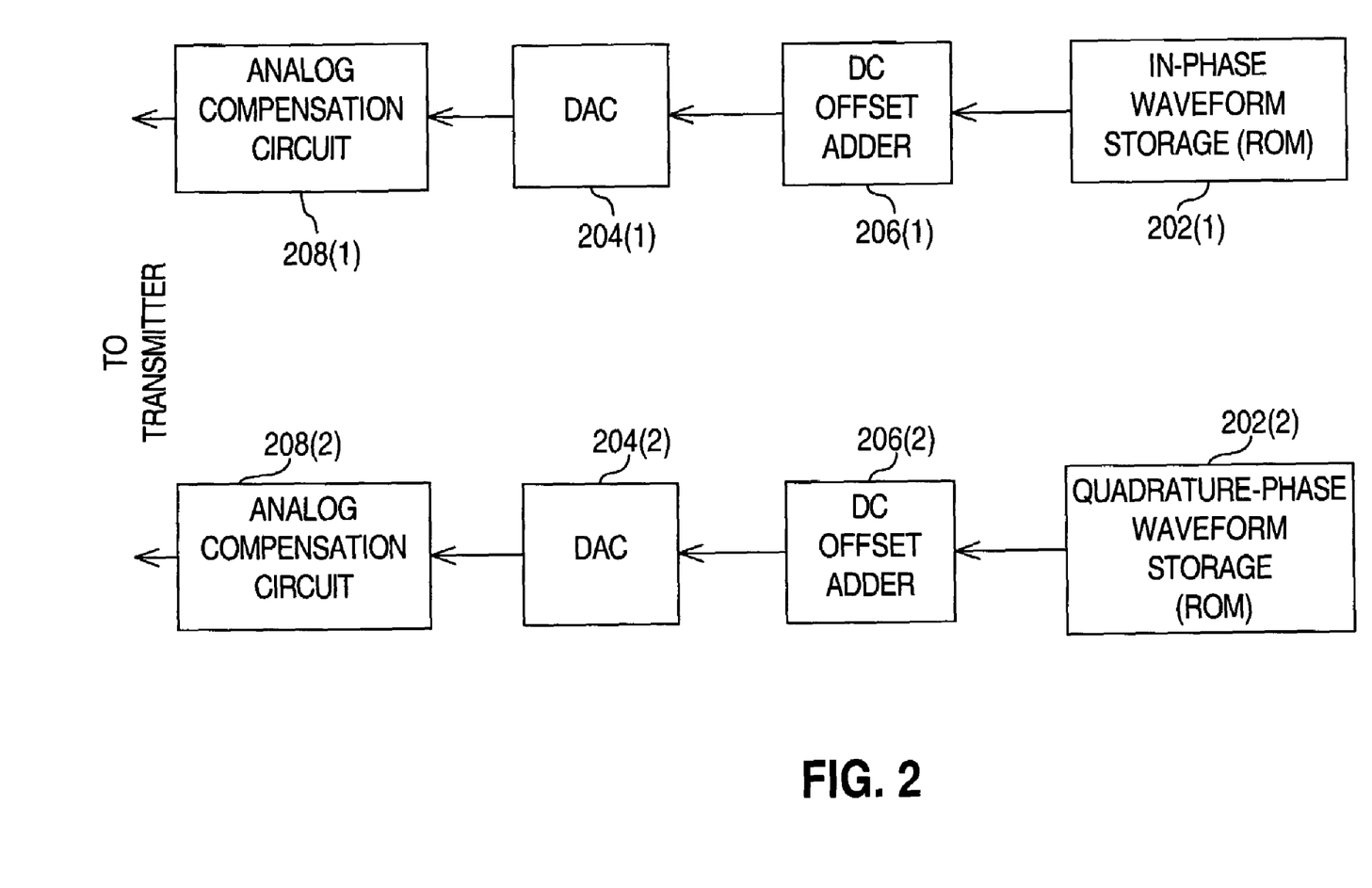
FIG. 2 is a block diagram of a signal modulation apparatus with components for compensating for DC offset and amplitude deviation.

To remedy the DC offset and amplitude deviation effects, the apparatus shown in FIG. 2 has sometimes been used. The apparatus of FIG. 2 is basically the same as the apparatus of FIG. 1, except that it further comprises a pair of DC offset adders 206 and a pair of analog compensation circuits 208. The DC offset adders 206 are used to compensate for the DC offset effects of the DAC's 204, while the analog compensation circuits 208 are used to adjust the analog outputs of the DAC's 204 to compensate for the amplitude deviations and the amplitude imbalance between the two DAC's 204.

The apparatus of FIG. 2 is effective in some limited circumstances. However, it has a number of significant drawbacks. A first drawback is that it requires the design and implementation of analog compensation circuits 208. Compensation circuits capable of adequately and accurately compensating for the amplitude deviations and amplitude imbalance of the DAC's 204 are very difficult and costly to design. Thus, these circuits add significant complexity and cost to the apparatus. A second drawback relates to the DC offset adders 206. Notice that the adders 206 are placed between the storages 202 and the DAC's 204. This means that the adders 206 need to operate every time any waveform is read from the storages 202. To prevent degrading the performance of the apparatus, the adders 206 need to be relatively high-speed adders. Such adders are costly to implement, and consume significant power. Yet another drawback of the apparatus is that it does not address the non-linearity effects of the DAC's 204 at all. These effects can lead to further errors.

As discussed above, the mechanisms currently available for modulating signals leave much to be desired. As a result, an improved modulating mechanism is needed.

SUMMARY

In accordance with one embodiment of the present invention, there is provided an improved modulating mechanism comprising a first storage and a corresponding first DAC, and a second storage and a corresponding second DAC. The first storage stores an adjusted digital representation of a first waveform, while the second storage stores an adjusted digital representation of a second waveform. The adjusted representation of the first waveform is adjusted to compensate for the deviation effects experienced by the first DAC (e.g. amplitude deviation, DC offset, non-linearity, etc.). The adjusted representation of the second waveform is adjusted to compensate for the deviation effects experienced by the second DAC. The adjusted representation of the first waveform causes the first DAC to output analog signals that are substantially the same as the analog signals that the first DAC would produce if the first DAC were converting an unadjusted digital representation of the first waveform and the deviation effects did not exist. Similarly, the adjusted representation of the second waveform causes the second DAC to output analog signals that are substantially the same as the analog signals that the second DAC would produce if the second DAC were converting an unadjusted digital representation of the second waveform and the deviation effects did not exist. In effect, the adjusted representations of the first and second waveforms cause the DAC's to exhibit the proper behavior, despite the presence of the deviation effects. By storing and using adjusted digital representations of waveforms in this manner, many benefits can be realized, including for example, eliminating the need for any analog compensation circuits. This and other benefits will be made clear by the following detailed description.

DETAILED DESCRIPTION OF EMBODIMENT(S)

Underlying Concepts

Before describing the invention in detail, a brief discussion of some underlying concepts will first be provided to facilitate a complete understanding of the invention.

As noted previously, a DAC can experience a variety of deviation effects, including but not limited to amplitude deviation, DC offset, and non-linearity. With amplitude deviation, a DAC produces output analog signals having the wrong amplitudes. For example, the DAC may output an analog signal with a 0.9 volt amplitude when it should actually output an analog signal with a 1 volt amplitude. It has been observed that amplitude deviation is usually caused by the inability of the DAC's circuitry to perfectly implement the proper gains. It has also been observed that amplitude deviation may be compensated for by changing the digital input fed to a DAC. More specifically, the input may be changed by multiplying the original input by a certain factor. The product of the multiplication may then be provided to the DAC as input. By changing the input in this way, it is possible to force the DAC to generate analog signals having the proper amplitudes. For example, if a digital input Z is supposed to cause a DAC to output an analog signal having an amplitude of 1 volt but in actuality causes the DAC to output an analog signal having an amplitude of 0.9 volts, then Z can be multiplied by a factor F to change the digital input to Z', where Z' is the digital input that, in actuality, causes the DAC to output an analog signal having an amplitude of 1 volt. By adjusting the input in this way, it is possible to cause the DAC to output analog signals having the proper amplitudes, despite the fact that the DAC suffers from amplitude deviation.

With regard to DC offset, the amplitude of an output analog signal is not affected, but the actual voltage generated by a DAC is shifted up or down by a certain DC voltage (an offset). It has been observed that a DC offset can also be compensated for by adjusting the digital input fed to the DAC. However, because the DC offset value is a constant, the input is adjusted not with a multiplying factor, but by adding a constant (either a positive or a negative value) to the input. This has the effect of shifting the voltage generated by the DAC by a certain amount, which is the desired result.

Figure 3:
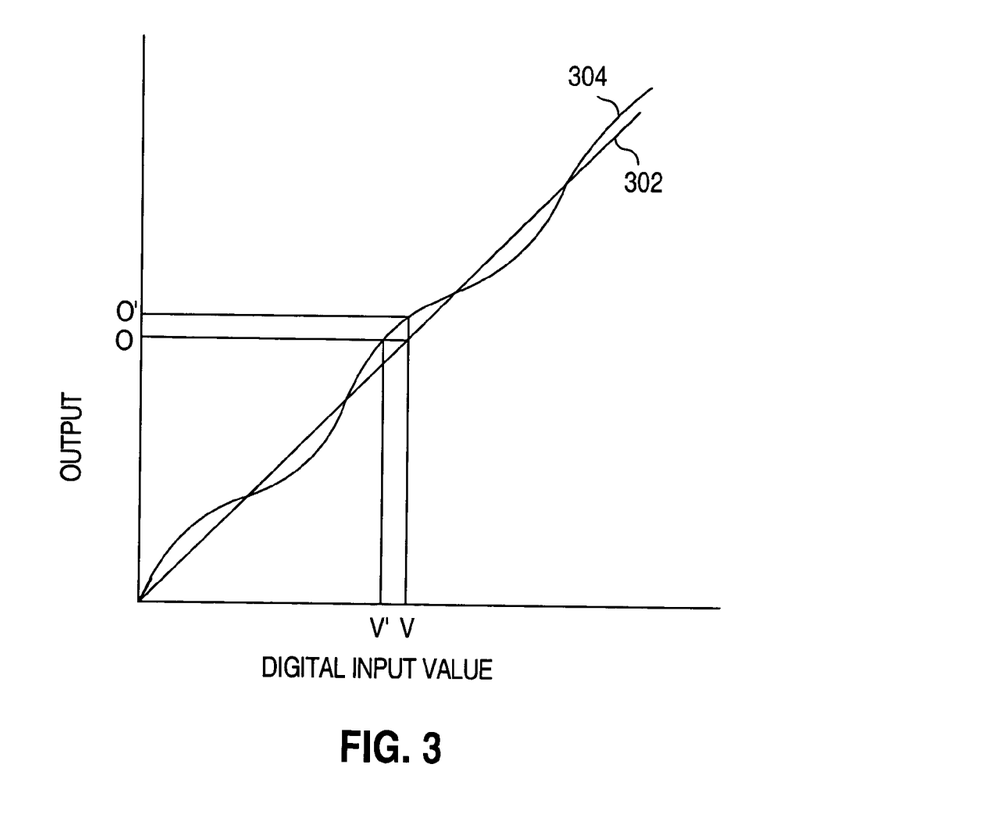
FIG. 3 shows a sample digital input vs. analog output plot for a DAC, which illustrates the non-linearity effect experienced by the DAC.

Compensating for the non-linearity effect is a bit more complicated. To illustrate the non-linearity problem, reference will be made to FIG. 3, which shows a digital input vs. analog output plot for a DAC. Ideally, the behavior of the DAC should be that shown by straight line 302 (this line shows the ideal linear behavior of a DAC). In actuality, however, the DAC more likely exhibits the behavior shown by wavy line 304. Because line 304 is not straight, the DAC will not always generate the expected output given a certain input. For example, according to the straight line 302, an input value of V should cause the DAC to generate an output O. In actuality, however, the DAC generates an output O' in response to an input value of V. To get the DAC to generate an output O the input value needs to be changed from V to V'. As shown by the plot, the amount of change needed may vary depending upon the input value. For some input values (e.g. those where the two lines 302, 304 intersect), no change is needed. For other input values, the input value may need to be increased or decreased to cause the DAC to generate the proper output. Whatever the case, if the desired behavior 302 and the actual behavior 304 of a DAC can be determined, it is possible to determine, for each input value, how that input value should be changed to compensate for the non-linearity effect experienced by the DAC.

As shown by the above discussion, it is possible to change the digital input applied to a DAC to force the DAC to exhibit the proper behavior, even if the DAC suffers from one or more deviation effects. This is the tact taken by one embodiment of the present invention, as described below.

Sample Embodiment

Figure 4:
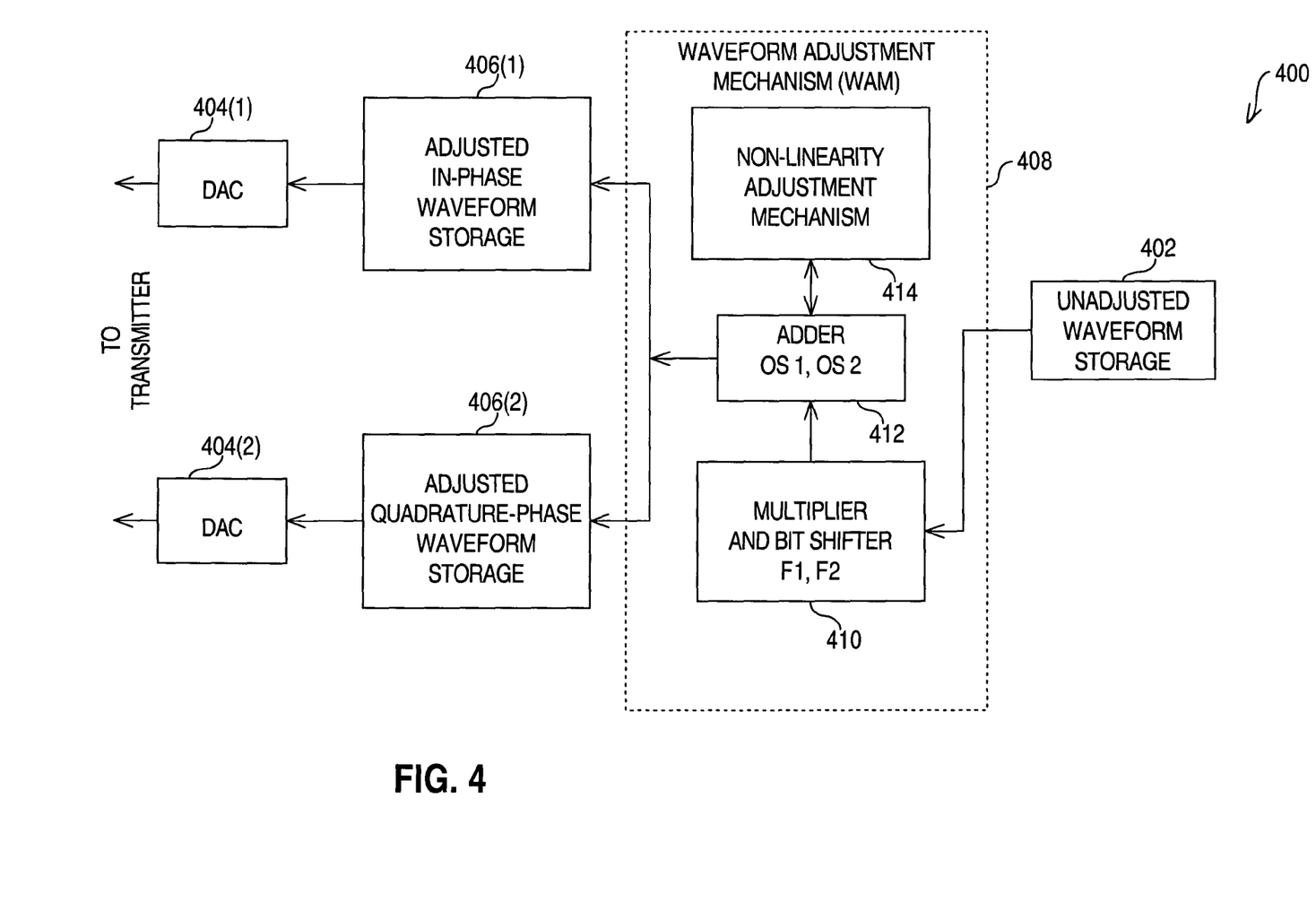
FIG. 4 is a block diagram of a modulating apparatus in accordance with one embodiment of the present invention.

With reference to FIG. 4, there is shown a block diagram of a modulating apparatus 400 in accordance with one embodiment of the present invention. In the following discussion, it will be assumed for illustrative purposes that the apparatus 400 is applied to GMSK in-phase and quadrature-phase waveforms. However, it should be noted that the present invention is not so limited, but rather may be applied to any type of data in any situation in which it is desirable to compensate for the deviation effects experienced by one or more DAC's.

As shown, apparatus 400 comprises two DAC's 404(1), 404(2). For illustrative purposes, it will be assumed that both DAC's 404(1), 404(2) suffer from deviation effects, including but not limited to amplitude deviation, DC offset, and non-linearity. The degree to which each DAC 404 suffers from each of these effects may differ. For example, the DAC's 404(1), 404(2) may experience different amplitude deviations, different DC offsets, and different non-linearities. Nonetheless, both DAC's 404(1), 404(2) suffer from each of these effects to some degree.

Each DAC 404 receives digital input from a corresponding storage 406(1), 406(2). Specifically, DAC 404(1) receives digital input from storage 406(1), while DAC 404(2) receives digital input from storage 406(2). Storage 406(1), which in one embodiment takes the form of a writable storage (e.g. a random access memory (RAM)), stores a set of adjusted in-phase waveforms. These in-phase waveforms have been adjusted to compensate for the deviation effects experienced by DAC 404(1). More specifically, the adjusted in-phase waveforms cause DAC 404(1) to output analog signals that are substantially the same as the analog signals that DAC 404(1) would produce if it were converting unadjusted in-phase waveforms and the deviation effects did not exist. In effect, the adjusted in-phase waveforms force DAC 404(1) to exhibit proper behavior, even though DAC 404(1) suffers from deviation effects.

Similarly, storage 406(2), which in one embodiment also takes the form of a writable storage (e.g. a random access memory (RAM)), stores a set of adjusted quadrature-phase waveforms. These quadrature-phase waveforms have been adjusted to compensate for the deviation effects experienced by DAC 404(2). More specifically, the adjusted quadrature-phase waveforms cause DAC 404(2) to output analog signals that are substantially the same as the analog signals that DAC 404(2) would produce if it were converting unadjusted quadrature-phase waveforms and the deviation effects did not exist. In effect, the adjusted quadrature-phase waveforms force DAC 404(2) to exhibit proper behavior, even though DAC 404(2) suffers from deviation effects.

The adjusted waveforms stored in storages 406(1), 406(2) are provided by waveform adjustment mechanism (WAM) 408. Specifically, WAM 408 takes unadjusted waveforms from storage 402, adjusts them to compensate for the deviation effects suffered by the DAC's 404(1), 404(2), and stores the adjusted waveforms in the appropriate storages 406(1), 406(2). In one embodiment, WAM 408 comprises a multiplier and bit shifter 410 (hereinafter, multiplier), an adder 412, and a non-linearity adjustment mechanism 414. The multiplier 410 compensates for the amplitude deviation effect, the adder 412 compensates for the DC offset effect, and the non-linearity adjustment mechanism 414 and the adder 412 working together compensate for the non-linearity effect. The operation and interaction between these various components will be described in a later section.

As noted previously, the non-linearity effect suffered by a DAC 404 may be compensated for by adding a compensation value (either a positive or a negative value) to the digital input fed to the DAC 404. This compensation value may vary depending upon the input. Accordingly, in one embodiment, the non-linearity adjustment mechanism 414 comprises one or more lists of digital input-compensation value pairs. These lists specify, for a particular digital input, what compensation value to use to adjust that digital input to compensate for the non-linearity effect. Since there are two DAC's 404(1), 404(2), and since each DAC 404 may experience a different non-linearity effect, mechanism 414 may comprise a separate list for each DAC 404 (i.e. separate lists for in-phase and quadrature-phase waveforms).

Storage 402 stores the unadjusted waveforms that are used and adjusted by WAM 408 to derive the adjusted waveforms. In one embodiment, storage 402 comprises both in-phase and quadrature-phase waveforms. Each waveform is stored in storage 402 in digital form (i.e. digital representations of the waveforms are stored in storage 402). Each waveform comprises X sample points, and each sample point takes the form of a set of Y digital bits. In one embodiment, X is set to 8 and Y is set to 10; thus, each waveform is represented as 8 sample points with each sample point being a 10-bit digital value.

Sample Operation

Figure 5:
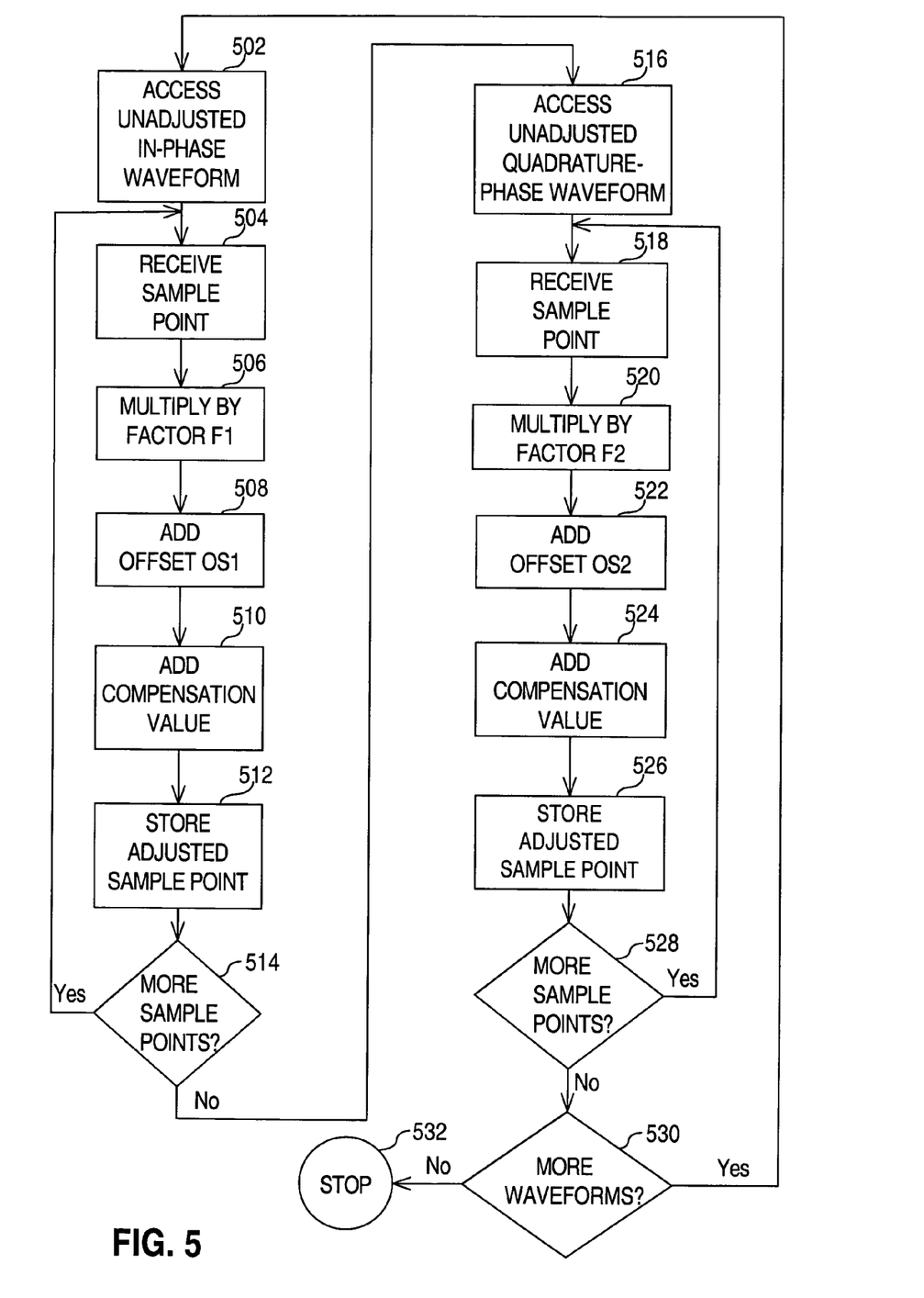
FIG. 5 is a flow diagram illustrating the initialization mode of operation of the apparatus of FIG. 4 in accordance with one embodiment of the present invention.
Figure 6:
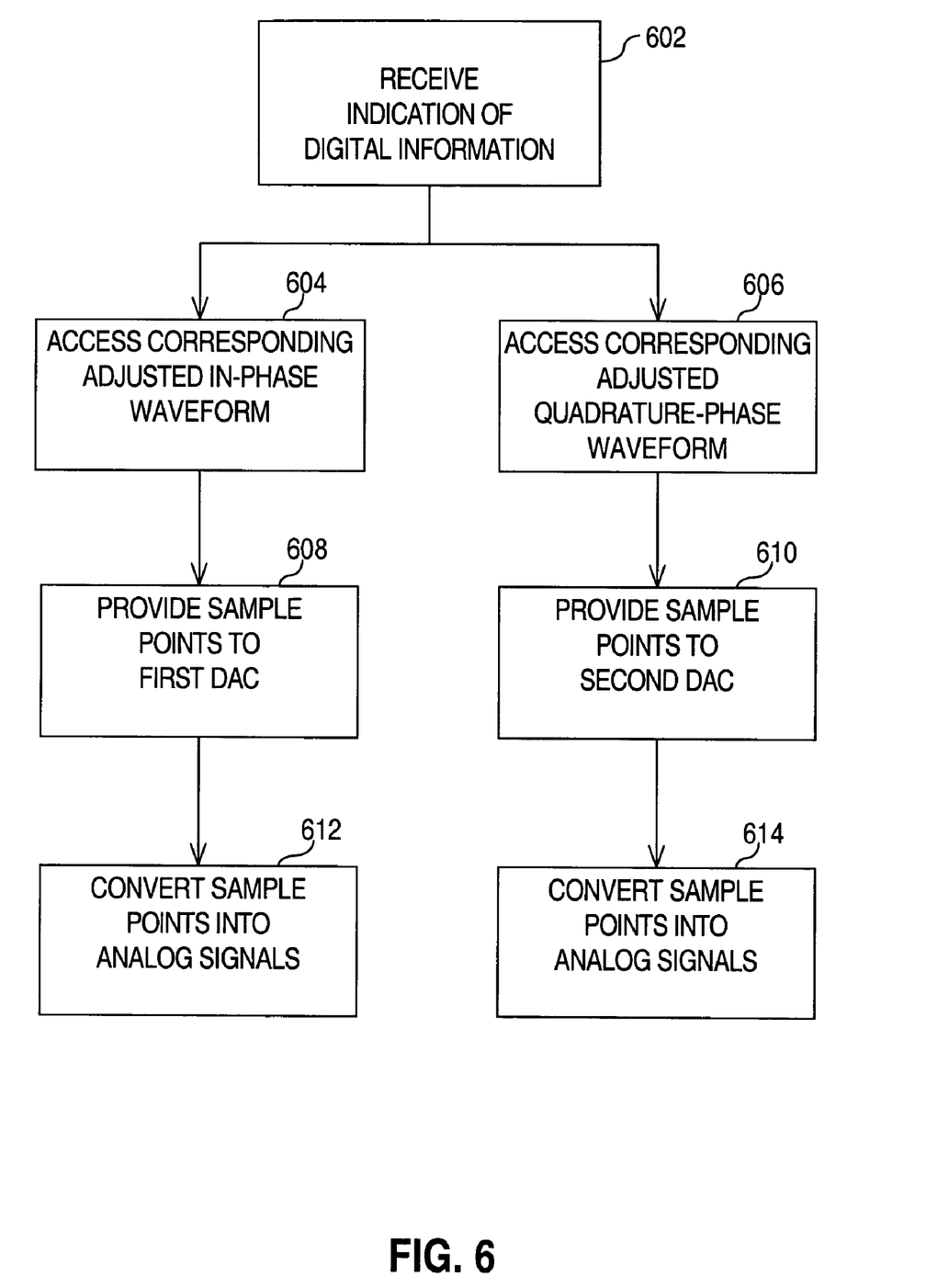
FIG. 6 is a flow diagram illustrating the regular operation mode of the apparatus of FIG. 4 in accordance with one embodiment of the present invention.

With reference to FIGS. 4, 5, and 6, the operation of apparatus 400 in accordance with one embodiment of the present invention will now be described. Apparatus 400 operates in two primary modes: initialization mode (FIG. 5) and regular operation mode (FIG. 6). In the initialization mode, the adjusted waveforms are generated and stored in storages 406(1), 406(2). In regular operation mode, adjusted waveforms are read out of storages 406(1), 406(2) and converted into analog signals by the DAC's 404(1), 404(2). In one embodiment, only the DAC's 404 and storages 406 are used in regular operation mode; thus, after initialization mode is completed, WAM 408 and storage 402 may be turned off. This has many benefits, including but not limited to power conservation.

Initialization Mode

Apparatus 400 enters initialization mode (FIG. 5) when the apparatus is powered up or reset. In initialization mode, WAM 408 cycles through the unadjusted waveforms stored in storage 402, adjusts them, and stores the adjusted waveforms in the appropriate storages 406. In doing so, the WAM 408, in one embodiment, implements the following process.

Initially, WAM 408 accesses (block 502) storage 402 and selects therefrom an unadjusted in-phase waveform. As noted above, in one embodiment, this waveform comprises 8 sample points, with each sample point represented as a 10-bit digital value. WAM 408 processes each of these sample points one at a time.

Specifically, multiplier 410 receives (block 504) one of the 8 sample points, and multiplies (block 506) that sample point by a certain multiplying factor F1, where F1 is the factor needed to compensate for the amplitude deviation suffered by DAC 404(1). By doing so, the multiplier 410 adjusts the sample point to a value that will cause the DAC 404(1) to output an analog signal having the proper amplitude. In this manner, multiplier 410 compensates for the amplitude deviation of the DAC 404(1).

In one embodiment, multiplier 410 achieves the multiplying function through a combination of a multiplication operation and a shifting operation. This is best understood by way of an example. Suppose that F1 is 1.2. Suppose further that the following equation holds: $F1=C/2^n$, where C and n are integers. If F1 is 1.2 and n is set to 9, then C is approximately 614 (rounded down). Put another way, $614/2^9$ is 1.1992, which is very close to 1.2. To multiply a sample point (which, as noted above, is a 10-bit digital value) by F1, multiplier first multiplies the sample point by the constant C, which in one embodiment is also a 10-bit digital value. In this example, C would be the 10-bit digital value 1001100110, which is equivalent to 614. The result of this multiplication operation is a 20-bit value. This 20-bit value is then shifted to the least significant bit (LSB) side n times (this has the effect of dividing the 20-bit value by $2^n$, which is $2^9$ in this example). The practical effect of these multiplication and shifting operations is that the sample point is multiplied by approximately the factor F1.

The output of the multiplier 410 is provided to adder 412. In turn, adder 412 adds (block 508) a constant offset OS1 (which may be a positive or negative value) to the output of the multiplier 410. This offset OS1 represents the DC offset suffered by DAC 404(1). By doing so, the adder 412 adjusts the sample point to a value that will compensate for the DC offset suffered by DAC 404(1).

To adjust for the non-linearity effect, adder 412 and non-linearity adjustment mechanism 414 work together. Specifically, adder 412 provides its current output (which represents the sample point after the factor F1 has been multiplied and the offset OS1 has been added) to mechanism 414. Using this digital value, mechanism 414 consults a digital input-compensation value list for DAC 404(1), and determines a compensation value corresponding to this digital value. After the compensation value is determined, it is provided to the adder 412. In response, adder 412 adds (block 510) the compensation value to the current output (i.e. the digital value provided to mechanism 414). The result of this operation is a fully adjusted sample point that has been adjusted to compensate for the amplitude deviation, DC offset, and non-linearity effects of DAC 404(1). Once generated, this sample point is stored (block 512) in storage 406(1). In this manner, an adjusted sample point is generated by WAM 408 and stored in the appropriate storage 406(1).

The above process takes care of one of the 8 sample points of the in-phase waveform. The process is repeated (block 514 loops back to block 504) to process each of the other sample points. After all 8 sample points are processed, storage 406(1) will have stored therein a complete adjusted version of the unadjusted in-phase waveform.

A similar process is implemented to handle a quadrature-phase waveform. Specifically, WAM 408 accesses (block 516) storage 402 and selects therefrom an unadjusted quadrature-phase waveform. As with the in-phase waveform, this quadrature-phase waveform comprises 8 sample points with each sample point represented as a 10-bit digital value. Then, each of the 8 sample points is processed as follows.

Multiplier 410 receives (block 518) one of the 8 sample points, and multiplies (block 520) that sample point by a certain multiplying factor F2, where F2 is the factor needed to compensate for the amplitude deviation suffered by DAC 404(2). By doing so, the multiplier 410 adjusts the sample point to a value that will cause the DAC 404(2) to output an analog signal having the proper amplitude. In this manner, multiplier 410 compensates for the amplitude deviation of the DAC 404(2).

The output of the multiplier 410 is provided to adder 412. In turn, adder 412 adds (block 522) a constant offset OS2 (which may be a positive or negative value) to the output of the multiplier 410. This offset OS2 represents the DC offset suffered by DAC 404(2). By doing so, the adder 412 adjusts the sample point to a value that will compensate for the DC offset suffered by DAC 404(2).

To adjust for the non-linearity effect, adder 412 and non-linearity adjustment mechanism 414 work together. Specifically, adder 412 provides its current output (which represents the sample point after the factor F2 has been multiplied and the offset OS2 has been added) to mechanism 414. Using this digital value, mechanism 414 consults a digital input-compensation value list for DAC 404(2), and determines a compensation value corresponding to this digital value. After the compensation value is determined, it is provided to the adder 412. In response, adder 412 adds (block 524) the compensation value to the current output (i.e. the digital value provided to mechanism 414). The result of this operation is a fully adjusted sample point that has been adjusted to compensate for the amplitude deviation, DC offset, and non-linearity effects of DAC 404(2). Once generated, this sample point is stored (block 526) in storage 406(2). In this manner, an adjusted sample point is generated by WAM 408 and stored in the appropriate storage 406(2).

The above process takes care of one of the 8 sample points of the quadrature-phase waveform. The process is repeated (block 528 loops back to block 518) to process each of the other sample points. After all 8 sample points are processed, storage 406(2) will have stored therein a complete adjusted version of the unadjusted quadrature-phase waveform.

The process described thus far generates the adjusted in-phase and quadrature-phase waveforms for one set of unadjusted in-phase and quadrature-phase waveforms. This process is repeated (block 530 loops back to block 502) until all of the waveforms stored in storage 402 are processed. At the end of the initialization mode, storages 406(1) and 406(2) will have all of the adjusted waveforms needed for regular operation.

Regular Operation Mode

After the storages 406(1), 406(2) are populated with adjusted in-phase waveforms and adjusted quadrature-phase waveforms, respectively, apparatus 400 is ready for regular operation (FIG. 6). As noted previously, in one embodiment, only the DAC's 404 and storages 406 are operated during regular operation; thus, WAM 408 and storage 402 may be deactivated, if so desired.

During regular operation, apparatus 400 receives (block 602) an indication of what digital information or data set (e.g. "0110") is to be modulated. In response, the adjusted in-phase waveform corresponding to that data set is accessed (block 604) from storage 406(1), and the adjusted quadrature-phase waveform corresponding to that data set is accessed (block 606) from storage 406(2). Each of the sample points of the adjusted in-phase waveform is provided (block 608), one at a time, to DAC 404(1), while each of the sample points of the adjusted quadrature-phase waveform is provided (block 610), one at a time, to DAC 404(2). In response, DAC 404(1) converts (block 612) each sample point of the adjusted in-phase waveform into a corresponding analog signal. Likewise, DAC 404(2) converts (block 614) each sample point of the adjusted quadrature-phase waveform into a corresponding analog signal. Because the adjusted in-phase waveform has been adjusted to compensate for the deviation effects suffered by DAC 404(1), and because the adjusted quadrature-phase waveform has been adjusted to compensate for the deviation effects suffered by DAC 404(2), both DAC's 404(1), 404(2) will output the proper analog signals. This is so despite the fact that both DAC's 404(1), 404(2) suffer from deviation effects. Thus, by adjusting the inputs fed to the DAC's 404(1), 404(2), it is possible to achieve proper DAC performance without the use of any analog compensation circuits. After the analog signals are generated by the DAC's 404(1), 404(2), they are passed on to a transmitter for transmission. In this manner, the digital information is modulated and transmitted.

Calibration

In the above discussion, it is disclosed that multiplying factors F1 and F2, offset values OS1 and OS2, and digital input-compensation value lists are used by WAM 408 to generate the adjusted waveforms. In one embodiment, these factors, values, and lists are determined through a calibration process. The calibration process may be carried out by a user or by an automatic calibration mechanism.

To determine the multiplying factors F1 and F2, and the offset values OS1 and OS2, test digital input is fed to each DAC 404, and corresponding output analog signals are read from each DAC 404. The analog signals from each DAC 404 are then compared against the analog signals that each DAC 404 should have produced. Based upon these comparisons, the multiplying factor F1, F2 needed to compensate for the amplitude deviation suffered by each DAC 404, and the offset value OS1, OS2 needed to compensate for the DC offset experienced by each DAC 404, are determined. Once determined, these parameters F1, F2, OS1, OS2 are provided to WAM 408 for use in generating the adjusted waveforms.

To determine the digital input-compensation value lists for each DAC 404, a complete set of test digital input is applied to each DAC 404, and the corresponding analog outputs are read from each DAC 404. The output response of each DAC 404 is then compared against the ideal linear DAC response. Based on this comparison, a compensation value is determined for each digital input for each DAC 404. At the end of this process, a digital input-compensation value list is derived for each DAC 404. Once derived, these lists are provided to WAM 408, and more specifically to mechanism 414, for use in generating the adjusted waveforms.

ALTERNATIVE EMBODIMENT(S)

The invention has thus far been described with reference to specific embodiments. It should be noted though that the invention is not so limited. Rather, various modifications may be made by those of ordinary skill in the art with the benefit of this disclosure without departing from the spirit of the invention. For example, storages 406(1), 406(2) may be implemented using a single storage rather than two separate storages. Also, rather than implementing WAM 408 with a multiplier, an adder, and a non-linearity adjustment mechanism, WAM 408 may instead be implemented with one or more processors executing computer instructions to carry out the functions of the multiplier, the adder, and the non-linearity adjustment mechanism. In addition, WAM 408 need not compensate for all deviation effects. Instead, WAM 408 may compensate for just amplitude deviation, or just DC offset, or just non-linearity, or a combination of one or more of these effects (e.g. amplitude deviation and DC offset but not non-linearity, or amplitude deviation and non-linearity but not DC offset, etc.). These and other modifications are within the scope of the present invention. Thus, the invention should not be limited by the specific embodiments used to illustrate it but only by the scope of the issued claims and their equivalents.

What is claimed is:

1. An apparatus for generating wireless communication signals, comprising:
    a first storage for storing an adjusted digital representation of a first waveform;
    a second storage for storing an adjusted digital representation of a second waveform;
    a first DAC (digital-to-analog converter) coupled to the first storage to receive the adjusted digital representation of the first waveform, the first DAC having a first amplitude deviation; and
    a second DAC coupled to the second storage to receive the adjusted digital representation of the second waveform, the second DAC having a second amplitude deviation;
    wherein the adjusted digital representation of the first waveform has been adjusted to compensate for the first amplitude deviation to cause the first DAC to output analog signals that are substantially the same as analog signals that the first DAC would produce if the first DAC were converting an unadjusted digital representation of the first waveform and the first amplitude deviation did not, exist; and
    wherein the adjusted digital representation of the second waveform has been adjusted to compensate for the second amplitude deviation to cause the second DAC to output analog signals that are substantially the same as analog signals that the second DAC would produce if the second DAC were converting an unadjusted digital representation of the second waveform and the second amplitude deviation did not exist.

2. The apparatus of claim 1, wherein the first and second storages may be implemented as separate storages or as a single storage.

3. The apparatus of claim 1, wherein the first and second storages are writable storages, such as random access memories.

4. The apparatus of claim 1, further comprising:
    a waveform adjustment mechanism (WAM), the WAM receiving and adjusting an unadjusted digital representation of the first waveform to derive the adjusted digital representation of the first waveform, the WAM receiving and adjusting an unadjusted digital representation of the second waveform to derive the adjusted digital representation of the second waveform.

5. The apparatus of claim 4, wherein the WAM derives the adjusted digital representation of the first waveform by multiplying the unadjusted digital representation of the first waveform by a first factor, and wherein the WAM derives the adjusted digital representation of the second waveform by multiplying the unadjusted digital representation of the second waveform by a second factor.

6. The apparatus of claim 5, wherein the WAM comprises one or more processors executing one or more sets of instructions.

7. The apparatus of claim 5, wherein the WAM comprises a multiplier for multiplying the unadjusted digital representation of the first/second waveform to the first/second factor respectively.

8. An apparatus for generating wireless communication signals, comprising:
    a first storage for storing an adjusted digital representation of a first waveform;

a second storage for storing an adjusted digital representation of a second waveform;
a first DAC (digital-to-analog converter) coupled to the first storage to receive the adjusted digital representation of the first waveform, the first DAC having a first amplitude deviation and a first DC (direct current) offset; and
a second DAC coupled to the second storage to receive the adjusted digital representation of the second waveform, the second DAC having a second amplitude deviation and a second DC offset;
wherein the adjusted digital representation of the first waveform has been adjusted to compensate for the first amplitude deviation and the first DC offset to cause the first DAC to output analog signals that are substantially the same as analog signals that the first DAC would produce if the first DAC were converting an unadjusted digital representation of the first waveform and the first amplitude deviation and the first DC offset did not exist; and
wherein the adjusted digital representation of the second waveform has been adjusted to compensate for the second amplitude deviation and the second DC offset to cause the second DAC to output analog signals that are substantially the same as analog signals that the second DAC would produce if the second DAC were converting an unadjusted digital representation of the second waveform and the second amplitude deviation and the second DC offset did not exist.

9. The apparatus of claim 8, wherein the first and second storages may be implemented as separate storages or as a single storage.

10. The apparatus of claim 8, wherein the first and second storages are writable storages, such as random access memories.

11. The apparatus of claim 8, further comprising:
a waveform adjustment mechanism (WAM), the WAM receiving and adjusting an unadjusted digital representation of the first waveform to derive the adjusted digital representation of the first waveform, the WAM receiving and adjusting an unadjusted digital representation of the second waveform to derive the adjusted digital representation of the second waveform.

12. The apparatus of claim 11, wherein the WAM derives the adjusted digital representation of the first waveform by multiplying the unadjusted digital representation of the first waveform by a first factor and adding a first offset value, and wherein the WAM derives the adjusted digital representation of the second waveform by multiplying the unadjusted digital representation of the second waveform by a second factor and adding a second offset value.

13. The apparatus of claim 12, wherein the WAM comprises one or more processors executing one or more sets of instructions.

14. The apparatus of claim 12, wherein the WAM comprises:
a multiplier for multiplying the unadjusted digital representation of the first/second waveform by the first/second factors respectively; and
an adder for adding an output of the multiplier to either the first offset value or the second offset value.

15. An apparatus for generating wireless communication signals, comprising:
a first storage for storing an adjusted digital representation of a first waveform;
a second storage for storing an adjusted digital representation of a second waveform;
a first DAC (digital-to-analog converter) coupled to the first storage to receive the adjusted digital representation of the first waveform, the first DAC having a first amplitude deviation, a first DC (direct current) offset, and a first non-linearity; and
a second DAC coupled to the second storage to receive the adjusted digital representation of the second waveform, the second DAC having a second amplitude deviation, a second DC offset, and a second non-linearity;
wherein the adjusted digital representation of the first waveform has been adjusted to compensate for the first amplitude deviation, the first DC offset, and the first non-linearity to cause the first DAC to output analog signals that are substantially the same as analog signals that the first DAC would produce if the first DAC were converting an unadjusted digital representation of the first waveform and the first amplitude deviation, the first DC offset, and the first non-linearity did not exist; and
wherein the adjusted digital representation of the second waveform has been adjusted to compensate for the second amplitude deviation, the second DC offset, and the second non-linearity to cause the second DAC to output analog signals that are substantially the same as analog signals that the second DAC would produce if the second DAC were converting an unadjusted digital representation of the second waveform and the second amplitude deviation, the second DC offset, and the second non-linearity did not exist.

16. The apparatus of claim 15, wherein the first and second storages may be implemented as separate storages or as a single storage.

17. The apparatus of claim 15, wherein the first and second storages are writable storages, such as random access memories.

18. The apparatus of claim 15, further comprising:
a waveform adjustment mechanism (WAM), the WAM receiving and adjusting an unadjusted digital representation of the first waveform to derive the adjusted digital representation of the first waveform, the WAM receiving and adjusting an unadjusted digital representation of the second waveform to derive the adjusted digital representation of the second waveform.

19. The apparatus of claim 18, wherein the WAM derives the adjusted digital representation of the first waveform by multiplying the unadjusted digital representation of the first waveform by a first factor, adding a first offset value, and adding a first compensation value, and wherein the WAM derives the adjusted digital representation of the second waveform by multiplying the unadjusted digital representation of the second waveform by a second factor, adding a second offset value, and adding a second compensation value.

20. The apparatus of claim 19, wherein the WAM comprises one or more processors executing one or more sets of instructions.

21. The apparatus of claim 19, wherein the WAM comprises:
a multiplier for multiplying the unadjusted digital representation of the first/second waveform by the first/second factors respectively;
a non-linearity adjustment mechanism for providing the compensation values; and
an adder for adding an output of the multiplier to either of the offset values and to either of the compensation values.

22. An apparatus for generating wireless communication signals, comprising:
- a first storage for storing an adjusted digital representation of a first waveform;
- a second storage for storing an adjusted digital representation of a second waveform;
- a first DAC (digital-to-analog converter) coupled to the first storage to receive the adjusted digital representation of the first waveform, the first DAC having a first amplitude deviation and a first non-linearity; and
- a second DAC coupled to the second storage to receive the adjusted digital representation of the second waveform, the second DAC having a second amplitude deviation and a second non-linearity;
- wherein the adjusted digital representation of the first waveform has been adjusted to compensate for the first amplitude deviation and the first non-linearity to cause the first DAC to output analog signals that are substantially the same as analog signals that the first DAC would produce if the first DAC were converting an unadjusted digital representation of the first waveform and the first amplitude deviation and the first non-linearity did not exist; and
- wherein the adjusted digital representation of the second waveform has been adjusted to compensate for the second amplitude deviation and the second non-linearity to cause the second DAC to output analog signals that are substantially the same as analog signals that the second DAC would produce if the second DAC were converting an unadjusted digital representation of the second waveform and the second amplitude deviation and the second non-linearity did not exist.

23. The apparatus of claim 22, wherein the first and second storages may be implemented as separate storages or as a single storage.

24. The apparatus of claim 22, wherein the first and second storages are writable storages, such as random access memories.

25. The apparatus of claim 22, further comprising:
- a waveform adjustment mechanism (WAM), the WAM receiving and adjusting an unadjusted digital representation of the first waveform to derive the adjusted digital representation of the first waveform, the WAM receiving and adjusting an unadjusted digital representation of the second waveform to derive the adjusted digital representation of the second waveform.

26. The apparatus of claim 25, wherein the WAM derives the adjusted digital representation of the first waveform by multiplying the unadjusted digital representation of the first waveform by a first factor and adding a first compensation value, and wherein the WAM derives the adjusted digital representation of the second waveform by multiplying the unadjusted digital representation of the second waveform by a second factor, and adding a second compensation value.

27. The apparatus of claim 26, wherein the WAM comprises one or more processors executing one or more sets of instructions.

28. The apparatus of claim 26, wherein the WAM comprises:
- a multiplier for multiplying the unadjusted digital representation of the first/second waveform by the first/second factors respectively;
- a non-linearity adjustment mechanism for providing the first and second compensation values; and
- an adder for adding an output of the multiplier to either of the first or second compensation values.

29. An apparatus for generating wireless communication signals, comprising:
- at least one writable storage for storing an adjusted digital representation of at least one waveform;
- at least one DAC (digital-to-analog converter) coupled to the writable storage to receive the adjusted digital representation of the waveform, the DAC having at least a deviation effect;
- a waveform adjustment mechanism (WAM) for receiving and adjusting an unadjusted digital representation of the waveform to derive the adjusted digital representation of the waveform; and
- wherein the adjusted digital representation of the waveform has been adjusted to compensate for the deviation effect to cause the DAC to output analog signals that are substantially the same as analog signals that the DAC would produce if the DAC were converting the unadjusted digital representation of the waveform and the deviation effect did not exist.

30. The apparatus of claim 29, wherein the writable storage is a random access memory.

31. The apparatus of claim 29, wherein the deviation effect comprises an amplitude deviation.

32. The apparatus of claim 31, wherein the WAM comprises a multiplier for multiplying the unadjusted digital representation of the waveform by a factor to compensate for the amplitude deviation.

33. The apparatus of claim 31, wherein the deviation effect further comprises a DC (direct current) offset.

34. The apparatus of claim 33, wherein the WAM comprises:
- a multiplier for multiplying the unadjusted digital representation of the waveform by a factor to compensate for the amplitude deviation; and
- an adder for adding an offset value to an output of the multiplier to compensate for the DC offset.

35. The apparatus of claim 29, wherein the deviation effect comprises non-linearity.

36. The apparatus of claim 35, wherein the WAM comprises:
- a multiplier for multiplying the unadjusted digital representation of the waveform by a factor;
- a non-linearity adjustment mechanism for providing a compensation value; and
- an adder for adding an output of the multiplier, an offset value and the compensation value to compensate for the non-linearity effect.

* * * * *